United States Patent
Goda

(10) Patent No.: US 10,681,236 B2
(45) Date of Patent: Jun. 9, 2020

(54) INFORMATION PROCESSING APPARATUS THAT CONTROLS POWER SUPPLY TO DIFFERENT DESTINATIONS, METHOD OF CONTROLLING THE SAME, AND STORAGE MEDIUM

(71) Applicant: CANON KABUSHIKI KAISHA, Tokyo (JP)

(72) Inventor: Keigo Goda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 178 days.

(21) Appl. No.: 15/889,381

(22) Filed: Feb. 6, 2018

(65) Prior Publication Data
US 2018/0167527 A1   Jun. 14, 2018

Related U.S. Application Data

(63) Continuation of application No. 15/369,028, filed on Dec. 5, 2016, now Pat. No. 9,924,058.

(30) Foreign Application Priority Data

Dec. 7, 2015   (JP) ................................ 2015-238691

(51) Int. Cl.
*H04N 1/00* (2006.01)
*H04N 1/327* (2006.01)
(Continued)

(52) U.S. Cl.
CPC ..... *H04N 1/00891* (2013.01); *H04N 1/00904* (2013.01); *H04N 1/32793* (2013.01);
(Continued)

(58) Field of Classification Search
CPC ........... H04N 1/00891; H04N 1/32793; H04N 1/00904; H04N 2201/001; H04N 2201/0094; H04W 4/008; H04W 84/12
See application file for complete search history.

(56) References Cited

U.S. PATENT DOCUMENTS 8,578,195 B2   11/2013   Park et al.
2009/0189737 A1*   7/2009   Oget .................... G06Q 10/087
                                                                340/10.1
(Continued)

FOREIGN PATENT DOCUMENTS

CN   102025866 A   4/2011
CN   102109901 A   6/2011
(Continued)

OTHER PUBLICATIONS

Office Action issued in U.S. Appl. No. 15/369,028 dated Jun. 1, 2017.
(Continued)

*Primary Examiner* — Ming Y Hon
(74) *Attorney, Agent, or Firm* — Rossi, Kimms & McDowell LLP

(57) ABSTRACT

An information processing apparatus capable of properly supplying electric power to a power supply destination associated with each function of a USB device. An MFP as the information processing apparatus is capable of operating in a power saving mode. A USB device having both of a Bluetooth communication function and a wireless LAN communication function is connected to the MFP. When an instruction for returning from the power saving mode is received from the USB device, it is determined whether the return instruction is an instruction generated due to the Bluetooth communication function or an instruction generated due to the wireless LAN communication function. Electric power supply destinations to which electric power (Continued)

is to be supplied when the information processing apparatus returns from the power saving mode are decided based on a result of the determination.

17 Claims, 17 Drawing Sheets

(51) Int. Cl.
H04W 4/80 (2018.01)
H04W 84/12 (2009.01)

(52) U.S. Cl.
CPC ............... H04N 2201/001 (2013.01); H04N 2201/0094 (2013.01); H04W 4/80 (2018.02); H04W 84/12 (2013.01); Y02D 70/00 (2018.01); Y02D 70/142 (2018.01); Y02D 70/144 (2018.01)

(56) References Cited

U.S. PATENT DOCUMENTS

| | | |
|---|---|---|
| 2010/0202018 A1 | 8/2010 | Akiyama et al. |
| 2010/0293403 A1 | 11/2010 | Yamashita |
| 2011/0161531 A1 | 6/2011 | Takayama |
| 2011/0273378 A1 | 11/2011 | Alameh et al. |
| 2012/0092714 A1* | 4/2012 | Suzuki ............... G06F 3/1212 358/1.15 |
| 2012/0194842 A1 | 8/2012 | Ushiku |
| 2013/0235406 A1 | 9/2013 | Umeda |
| 2013/0332599 A1 | 12/2013 | Boodannavar et al. |
| 2014/0268251 A1* | 9/2014 | Shimizu ............ H04N 1/00896 358/468 |
| 2014/0376033 A1 | 12/2014 | Tokishige |
| 2015/0062643 A1 | 3/2015 | Hagiwara |
| 2015/0256700 A1 | 9/2015 | Sakai |
| 2015/0373222 A1 | 12/2015 | Wang |
| 2016/0100073 A1 | 4/2016 | Takatani |
| 2016/0212288 A1 | 7/2016 | Hasegawa |
| 2016/0219433 A1 | 7/2016 | Naruse |
| 2016/0360477 A1 | 12/2016 | Saeki et al. |

FOREIGN PATENT DOCUMENTS

| | | |
|---|---|---|
| CN | 102884841 A | 1/2013 |
| CN | 104426587 A | 3/2015 |
| JP | 2004038295 A | 2/2004 |
| JP | 2010111105 A | 5/2010 |
| JP | 2012039868 A | 2/2012 |
| JP | 2014030077 A | 2/2014 |

OTHER PUBLICATIONS

Notice of Allowance issued in U.S. Appl. No. 15/369,028 dated Nov. 6, 2017.
Office Action issued in Japanese Application No. 2015-238691 dated Sep. 24, 2019.
Office Action issued in Chinese Appln. No. 201611110036.0 dated Nov. 26, 2018. English translation provided.

* cited by examiner

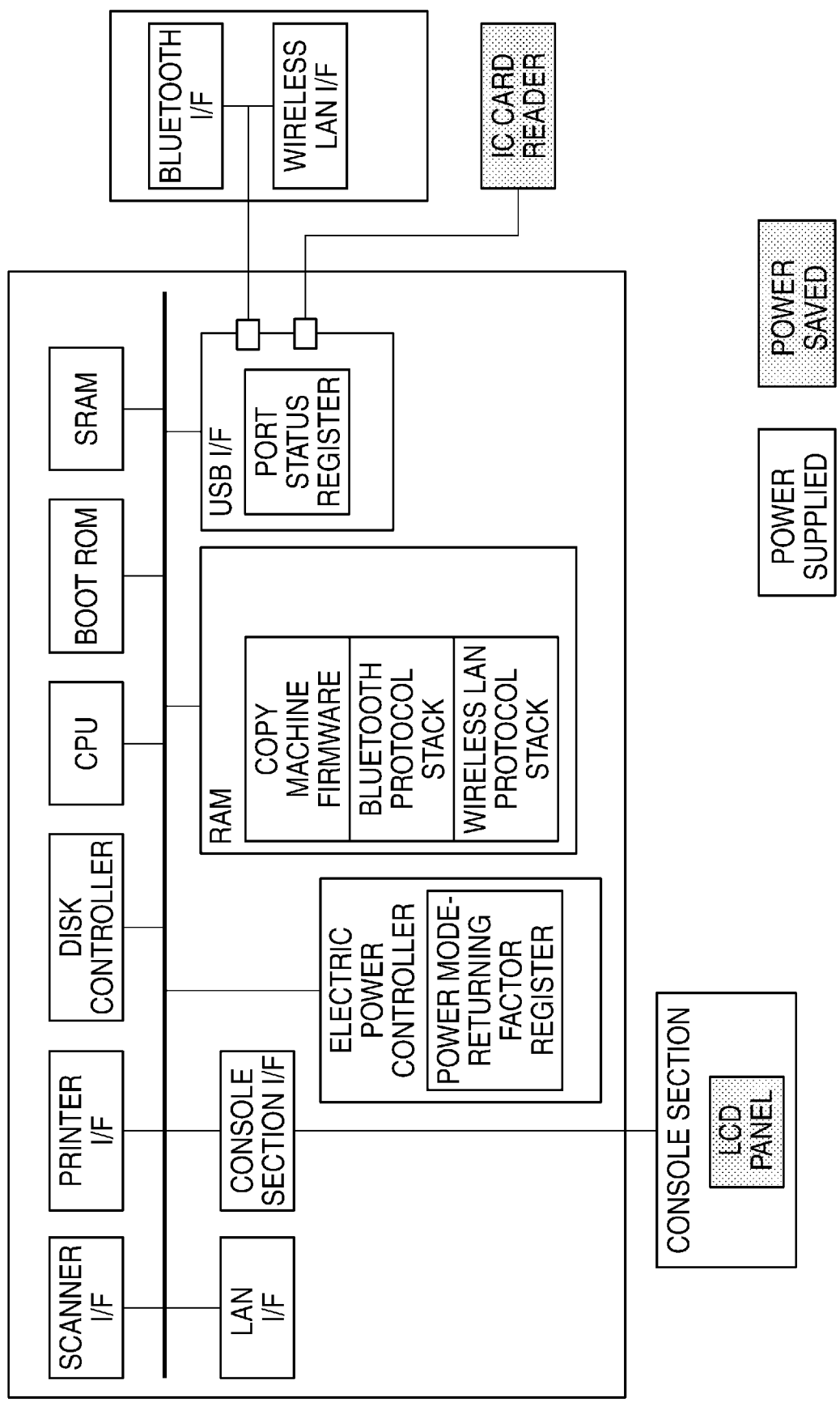

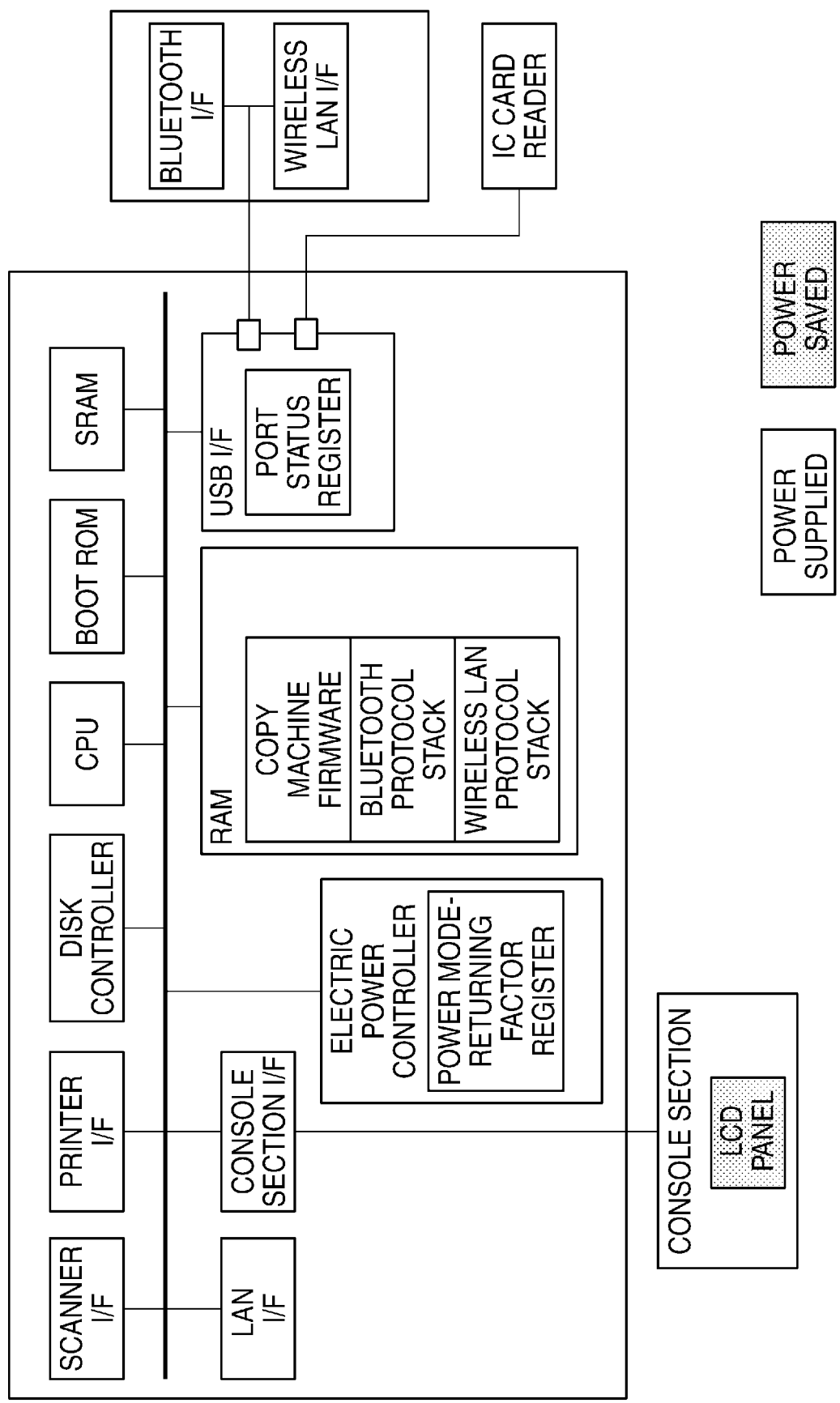

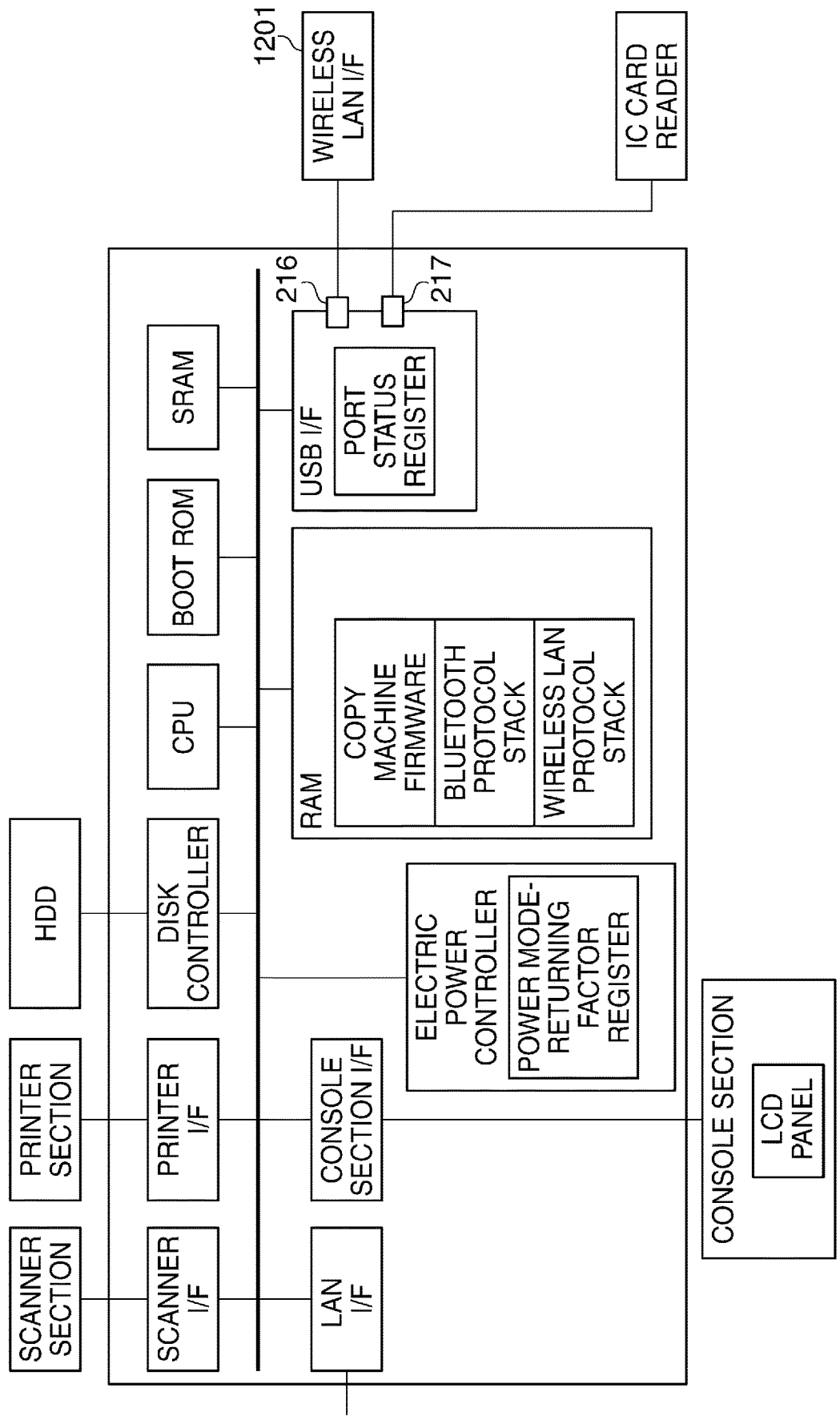

ically, an MFP can be connected to a USB device, and the USB device has not only a storage function, but also at least one of communication functions for realizing Wi-Fi communication, Bluetooth (registered trademark) communication as short-distance wireless communication, such as BLE (Bluetooth Low Energy), and so forth. The USB device is capable of transmitting a return request signal to the MFP, for causing the MFP to return from the power saving mode. The specifications of the return request signal are defined by the USB standard, and in general, the return request signal includes only an instruction for returning from the power saving mode. Upon receipt of the return request signal from the USB device, the MFP performs the returning processing associated with a function of the USB device (see e.g. Japanese Patent Laid-Open Publication No. 2010-111105). For example, in a case where a USB device having the BLE communication function is connected to the MFP, upon receipt of a return request signal transmitted from the USB device due to the BLE communication function, the MFP supplies electric power to the console panel as a power supply destination associated with BLE communication. On the other hand, in a case where a USB device having the Wi-Fi communication function is connected to the MFP, upon receipt of a return request signal transmitted from the USB device due to the Wi-Fi communication function, the MFP supplies electric power to power supply destinations associated with Wi-Fi communication. Note that the console panel is not included in the power supply destinations associated with Wi-Fi communication. Therefore, in the processing for returning from the power saving mode, the# INFORMATION PROCESSING APPARATUS THAT CONTROLS POWER SUPPLY TO DIFFERENT DESTINATIONS, METHOD OF CONTROLLING THE SAME, AND STORAGE MEDIUM

BACKGROUND OF THE INVENTION

Field of the Invention

The present invention relates to an information processing apparatus having a power saving mode, a method of controlling the same, and a storage medium.

Description of the Related Art

There has been known an MFP as an information processing apparatus that shifts to a power saving mode in which power consumption can be reduced during a time period over which none of various kinds of processing are performed. In the power saving mode, electric power is supplied only to minimum necessary components of the MFP. Upon receipt of an instruction for performing each of the various kinds of processing, the MFP performs processing for returning from the power saving mode, and supplies electric power to power supply destinations, i.e. components necessary for performing processing corresponding to the received instruction. For example, in a case where the MFP receives print data for performing print processing e.g. from a client PC, the MFP supplies electric power to a printer section that performs print processing, and in a case where a console panel is touched by a user, the MFP supplies electric power to the console panel. That is, in the processing for returning from the power saving mode, the MFP supplies electric power to the power supply destinations which are different depending on a power mode-returning factor.

Incident MFP supplies electric power to the power supply destinations different depending on the function of a USB device connected to the MFP.

However, as described above, the return request signal transmitted from a USB device includes only an instruction for returning from the power saving mode. On the other hand, there is a case where a USB device has two functions of the Wi-Fi communication function and the BLE communication function. In this case, even when the MFP receives a return request signal from this USB device, the MFP cannot determine whether the received return request signal is a signal transmitted due to the Wi-Fi communication function or a signal transmitted due to the BLE communication function. As a result, the MFP cannot properly supply electric power to a power supply destination associated with each function of the USB device.

SUMMARY OF THE INVENTION

The present invention provides an information processing apparatus that has a power saving mode and is capable of properly supplying electric power to a power supply destination associated with each function of a USB device, a method of controlling the same, and a storage medium.

In a first aspect of the present invention, there is provided an information processing apparatus that is capable of operating in a power saving mode, comprising a wireless communication unit that has both of a first wireless communication function and a second wireless communication function, a determination unit configured to determine, in a case where an instruction for returning from the power saving mode is received from the wireless communication unit, whether the return instruction is an instruction generated due to the first wireless communication function or an instruction generated due to the second wireless communication function, and a decision unit configured to decide, based on a result of determination performed by the determination unit, electric power supply destinations to which electric power is to be supplied when the information processing apparatus returns from the power saving mode.

In a second aspect of the present invention, there is provided a method of controlling an information processing apparatus that includes a wireless communication unit having both of a first wireless communication function and a second wireless communication function, and is capable of operating in a power saving mode, comprising determining, in a case where an instruction for returning from the power saving mode is received from the wireless communication unit, whether the return instruction is an instruction generated due to the first wireless communication function or an instruction generated due to the second wireless communication function, and deciding, based on a result of said determining, electric power supply destinations to which electric power is to be supplied when the information processing apparatus returns from the power saving mode.

In a third aspect of the present invention, there is provided a non-transitory computer-readable storage medium storing a computer-executable program for executing a method of controlling an information processing apparatus that includes a wireless communication unit having both of a first wireless communication function and a second wireless communication function, and is capable of operating in a power saving mode, wherein the method comprises determining, in a case where an instruction for returning from the power saving mode is received from the wireless communication unit, whether the return instruction is an instruction generated due to the first wireless communication function or an instruction generated due to the second wireless communication function, and deciding, based on a result of said determining, electric power supply destinations to which electric power is to be supplied when the information processing apparatus returns from the power saving mode.

According to the present invention, it is possible to properly supply electric power to a power supply destination associated with each function of a USB device.

Further features of the present invention will become apparent from the following description of exemplary embodiments (with reference to the attached drawings).

BRIEF DESCRIPTION OF THE DRAWINGS

FIGS. 5A to 5F are diagrams useful in explaining a state of power supply to the MFP and USB devices appearing in FIG. 2, in which FIG. 5A shows a state where the USB devices have shifted to a USB power saving mode, FIG. 5B shows a state where the MFP has shifted to the power saving mode, FIG. 5C shows a state where the MFP has returned to a normal mode, FIG. 5D shows a state where a multi-function device has returned to a normal mode, FIG. 5E shows a state where all of the USB devices have returned to the normal mode, and electric power is supplied to an LCD panel of the MFP, and FIG. 5F shows a state where all of the USB devices have returned to the normal mode.

FIGS. 6A to 6D are diagrams useful in explaining a mode shifting process performed by the MFP and the USB devices appearing in FIG. 2, in which FIG. 6A is a flowchart of a transmission process performed by a Bluetooth interface, FIG. 6B is a flowchart of a transmission process performed by a wireless LAN interface, FIG. 6C is a flowchart of a notification process performed by a USB interface, and FIG. 6D is a flowchart of a power supply control process performed by an electric power controller.

FIG. 12 is a diagram showing an example of connection to ports of the MFP shown in FIG. 1.

DESCRIPTION OF THE EMBODIMENTS

The present invention will now be described in detail below with reference to the accompanying drawings showing embodiments thereof.

Although in the present embodiment, a description will be given of a case where the present invention is applied to an MFP as an information processing apparatus that is configured to shift to a power saving mode (power saving state), the present invention can be applied not only to the MFP but also to any information processing apparatus insofar as it is an information processing apparatus, such as a printer and a scanner, that is capable of performing return processing for returning from the power saving mode based on a return request signal transmitted e.g. from a USB device.

Figure 1:
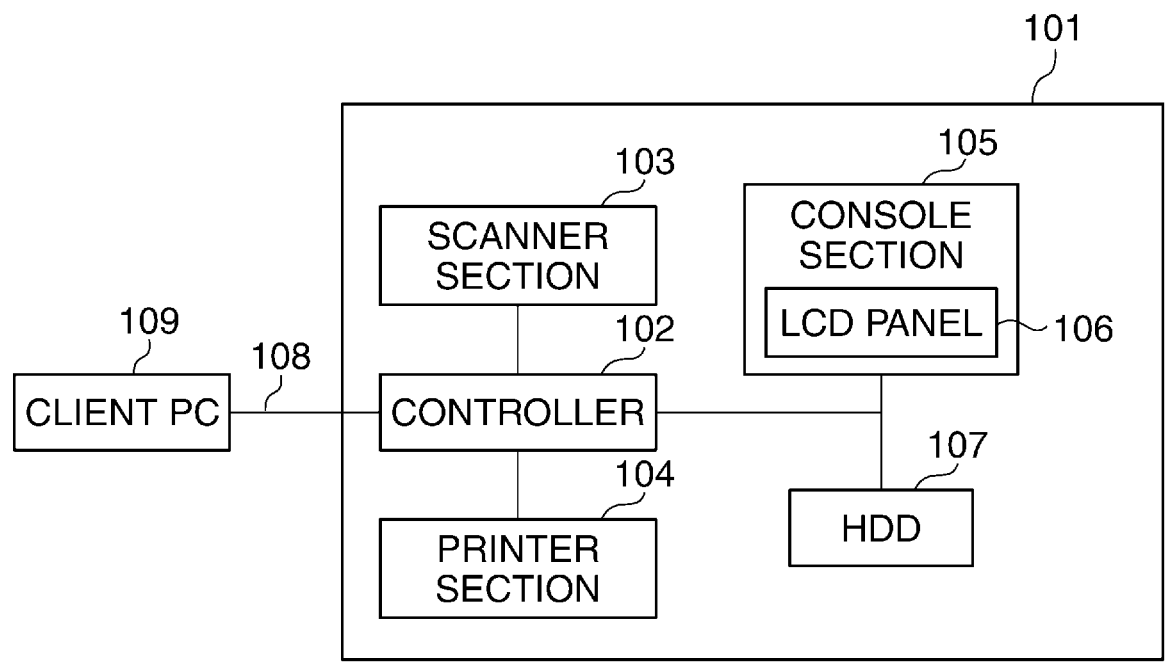
FIG. 1 is a schematic block diagram of an MFP as an information processing apparatus according to an embodiment of the present invention.

FIG. 1 is a schematic block diagram of the MFP, denoted by reference numeral 101, as the information processing apparatus according to the embodiment of the present invention.

Referring to FIG. 1, the MFP 101 includes a controller 102, a scanner section 103, a printer section 104, a console section 105, and an HDD 107, and the controller 102 is connected to the scanner section 103, the printer section 104, the console section 105, and the HDD 107. The console section 105 includes an LCD panel 106.

The controller 102 controls the overall operation of the MFP 101, and further, the controller 102 performs data communication with a client PC 109 connected thereto via a LAN 108. The scanner section 103 reads an original placed on an original platen glass, not shown, to thereby generate image data, and sends the generated image data to the controller 102. The printer section 104 performs print processing based on image data generated by the scanner section 103, print data transmitted from the client PC 109 via the LAN 108, or the like data. The console section 105 includes the LCD panel 106 for displaying e.g. setting information of the MFP 101, and operation buttons, not shown, for configuring the settings of the MFP 101. For example, in a case where the MFP 101 has shifted to the power saving mode and the display of the LCD panel 106 has been turned off, if the LCD panel 106 is touched by a user, the console section 105 sends a return instruction notification for instructing returning of the MFP 101 to an electric power controller 213, appearing in FIG. 2, referred to hereinafter. Upon receipt of the return instruction notification, electric power is supplied to the LCD panel 106, whereby the display of the LCD panel 106 is turned on. The HDD 107 stores control programs and data used by the controller 102.

Figure 2:
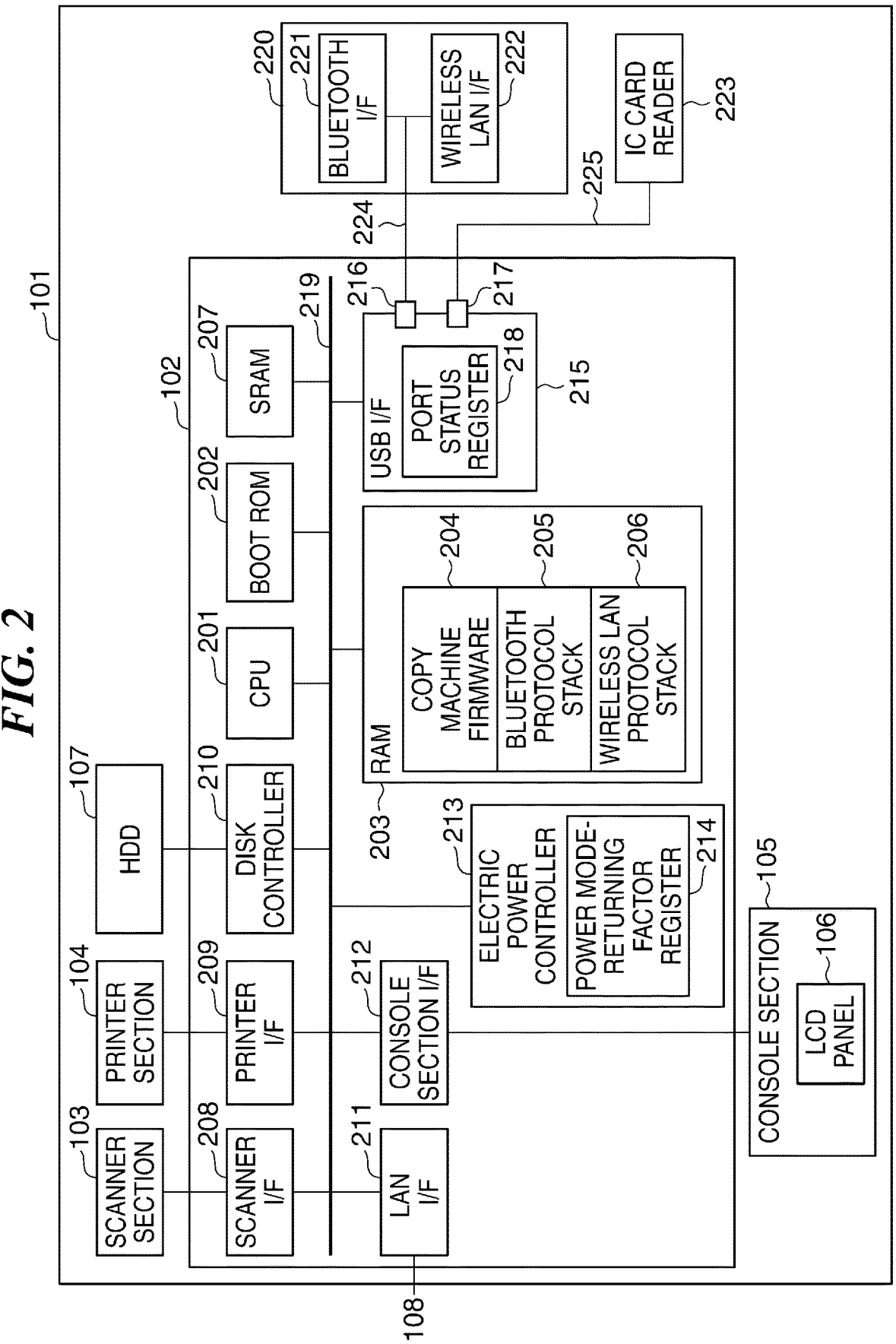
FIG. 2 is a schematic block diagram of a controller appearing in FIG. 1.

FIG. 2 is a schematic block diagram of the controller 102 appearing in FIG. 1.

Referring to FIG. 2, the MFP 101 includes not only the controller 102, the scanner section 103, the printer section 104, the console section 105, and the HDD 107, but also a multi-function device 220 and an IC card reader 223. The multi-function device 220 includes a Bluetooth interface 221 and a wireless LAN interface 222, and the multi-function device 220 and the IC card reader 223 are each connected to the controller 102. The controller 102 includes a CPU 201, a boot ROM 202, a RAM 203, an SRAM 207, a scanner interface 208, a printer interface 209, a disk controller 210, and a LAN interface 211. Further, the controller 102 includes a console section interface 212, the electric power controller 213, and a USB interface 215. The CPU 201, the boot ROM 202, the RAM 203, the SRAM 207, the scanner interface 208, the printer interface 209, the disk controller 210, and the LAN interface 211 are interconnected via a system bus 219. Further, the console section interface 212, the electric power controller 213, and the USB interface 215 are interconnected via the system bus 219. The electric power controller 213 includes a power mode-returning factor register 214, and the USB interface 215 includes a plurality of, e.g., two ports (first port and second port) 216 and 217, and a port status register 218.

The CPU 201 controls the components connected to the system bus 219 using the programs stored in the ROM 202 and the HDD 107. The boot ROM 202 stores a boot program, such as BIOS (Basic Input Output System). The RAM 203 is used as a main storage memory for the CPU 201, and stores programs used by the CPU 201, more specifically, copy machine firmware 204, a Bluetooth protocol stack 205, a wireless LAN protocol stack 206, and so forth. The copy machine firmware 204 performs control of associated components of the MFP 101. The Bluetooth protocol stack 205 controls the Bluetooth interface 221 of the multi-function device 220 connected to the USB interface 215. With this control, the MFP 101 performs Bluetooth communication, such as BLE communication, with an apparatus that is capable of performing short-distance wireless communication via the Bluetooth interface 221 of the multi-function device 220, described hereinafter. The wireless LAN protocol stack 206 controls the wireless LAN interface 222 of the multi-function device 220 connected to the USB interface 215. With this control, the MFP 101 performs wireless LAN communication, such as Wi-Fi communication, with an apparatus capable of performing wireless communication which is wider in communication range than the short-distance wireless communication via the wireless LAN interface 222 of the multi-function device 220, described hereinafter.

The SRAM 207 is a nonvolatile memory, and stores settings used in the MFP 101. The scanner interface 208 performs data communication with the scanner section 103, the printer interface 209 performs data communication with the printer section 104, and the disk controller 210 controls storing of data into the HDD 107. The LAN interface 211 performs data communication with the client PC 109 via the LAN 108. Further, the LAN interface 211 sends a return instruction notification to the electric power controller 213 upon receipt of print data from the client PC 109 when the MFP 101 is in the power saving mode. The console section interface 212 performs data communication with the console section 105. The electric power controller 213 controls the supply of electric power to the components of the MFP 101, and shifts the MFP 101 to the power saving mode and the normal mode. The electric power controller 213 supplies electric power only to necessary minimum components of the MFP 101 when various kinds of processing are not being performed in the MFP 101. With this control, the MFP 101 shifts to the power saving mode, and is capable of performing necessary minimum operations even in the power saving mode. During the power saving mode, upon receipt of a return instruction notification from any of the console section 105, the LAN interface 211, and the USB interface 215, the electric power controller 213 stores notification sender information including information indicative of the sender of the received return instruction notification in the power mode-returning factor register 214.

The USB interface 215 performs data communication with USB devices connected to the first and second ports 216 and 217, respectively. In the present embodiment, the multi-function device 220 is connected to the first port 216 via a USB cable 224, and the IC card reader 223 is connected to the second port 217 via a USB cable 225.

The multi-function device 220 has a Bluetooth communication function (first wireless communication function) and a wireless LAN communication function (second wireless communication function). The multi-function device 220 is a combo chip supporting a plurality of wireless communication standards (the Bluetooth communication function and the wireless LAN communication function in the present embodiment). The multi-function device 220 includes one antenna (not shown). The Bluetooth interface 221 and the wireless LAN interface 222 share this one antenna, and the Bluetooth communication function and the wireless LAN communication function are performed in a time sharing manner.

The IC card reader 223 has a function of reading an IC card. When the MFP 101 normally shifts to the power saving mode, the USB interface 215 sends a notification to the effect that the MFP 101 is to shift to the power saving mode, to the USB devices connected to the first and second ports 216 and 217, respectively. Upon receipt of this notification, each USB device shifts to a power saving mode defined by the USB standard (hereinafter referred to as the "USB power saving mode"). In the USB power saving mode, only part of functions of each USB device can be used. Each USB device has a remote wake-up function, and can transmit a return request signal to the MFP 101 during the USB power saving mode. For example, upon receipt of a data communication request from an apparatus capable of performing Bluetooth communication or an apparatus capable of performing wireless LAN communication during the USB power saving mode, the multi-function device 220 transmits a return request signal to the MFP 101. Upon receipt of the return request signal via one of the first and second ports 216 and 217, the USB interface 215 stores port information indicative of a port having received the return request signal (hereinafter referred to as the "reception port") in the port status register 218. Further, the USB interface 215 sends a return instruction notification to the electric power controller 213.

Figure 3:
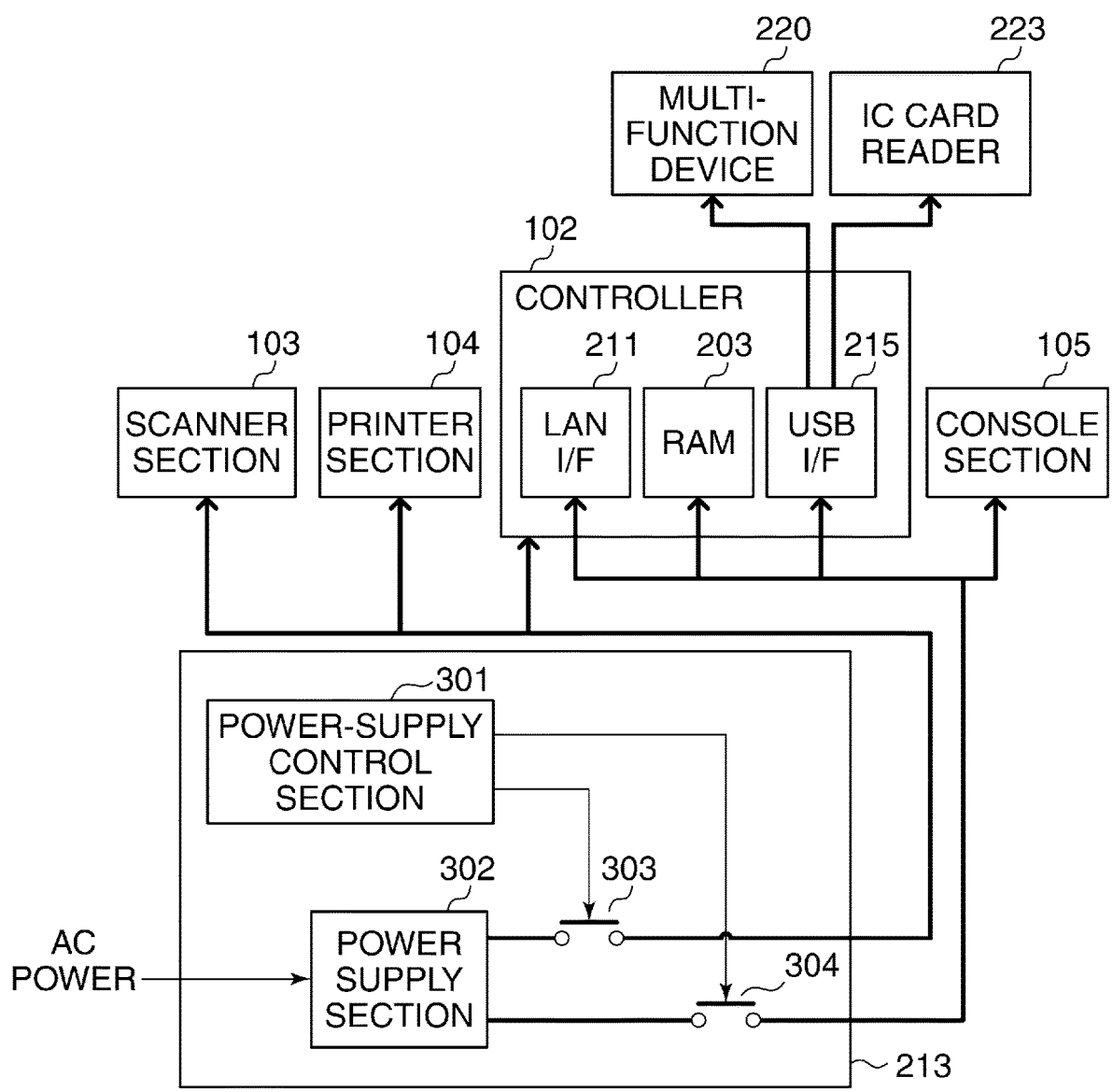
FIG. 3 is a diagram useful in explaining electric power supply control performed by the MFP shown in FIG. 1.

FIG. 3 is a diagram useful in explaining electric power supply control performed by the MFP 101, shown in FIG. 1.

Referring to FIG. 3, the electric power controller 213 includes a supply control section 301, a power supply section 302, and first and second switches 303 and 304 each having three terminals including a control terminal. The power supply section 302 is connected to respective input terminals of the first and second switches 303 and 304, and the supply control section 301 is connected to respective control terminals of the first and second switches 303 and 304. The first switch 303 has an output terminal to which are connected the controller 102, the scanner section 103, and the printer section 104, and the second switch 304 has an output terminal to which are connected the console section 105, the RAM 203, the LAN interface 211, and the USB interface 215. The USB interface 215 is connected to the multi-function device 220 and the IC card reader 223.

The power supply section 302 supplies, based on the input AC power, electric power to the components to which the output terminal of each of the first and second switches 303 and 304 is connected. The supply control section 301 controls application of power from the power supply section 302 to destinations to which the output terminals of the first and second switches 303 and 304 are connected. When the MFP 101 shifts to the power saving mode, the supply control section 301 performs control such that only the second switch 304 passes electric power to thereby supply electric power only to destinations to which the output terminal of the second switch 304 is connected. On the other hand, when the MFP 101 shifts to the normal mode, the supply control section 301 performs control such that both of the first and second switches 303 and 304 pass electric power to thereby supply electric power to the destinations to which the respective output terminals of the first and second switches 303 and 304 are connected. Electric power is supplied to the multi-function device 220 and the IC card reader 223 via the USB interface 215.

Figure 4:
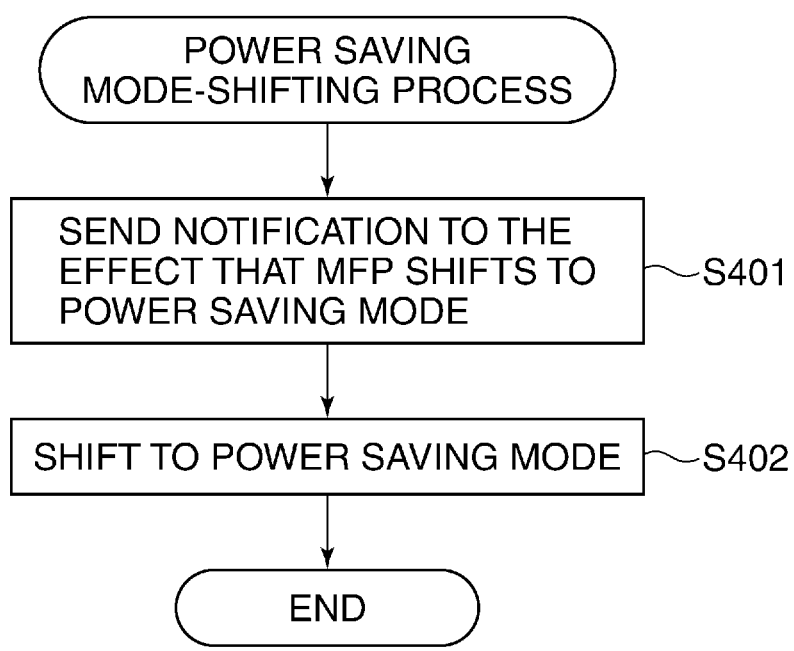
FIG. 4 is a flowchart of a power saving mode-shifting process performed by the MFP shown in FIG. 1.

FIG. 4 is a flowchart of a power saving mode-shifting process performed by the MFP 101 shown in FIG. 1.

The process in FIG. 4 is performed by the CPU 201 that executes the programs stored in the HDD 107 and the boot ROM 202.

Figure 5A:
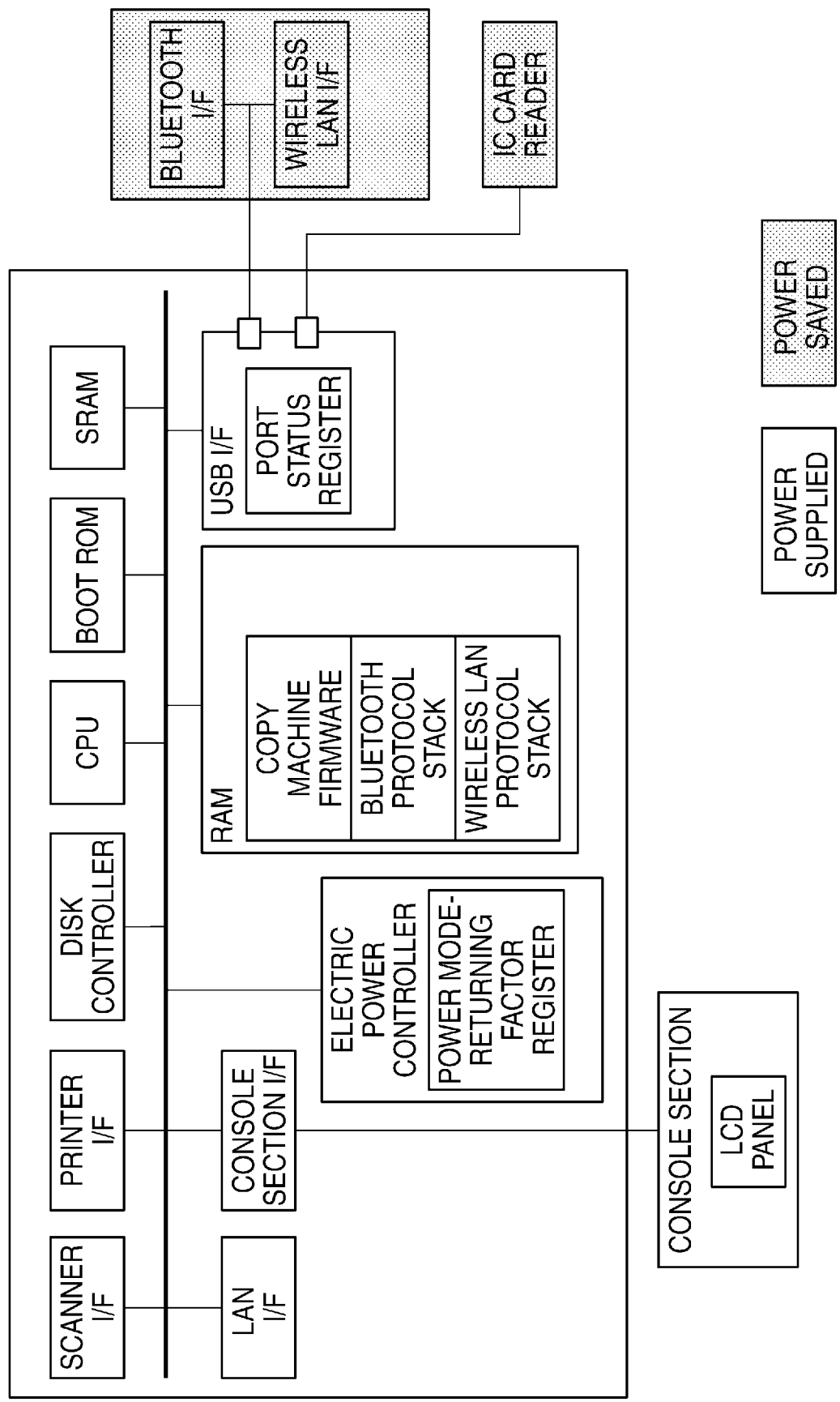
Figure 5B:
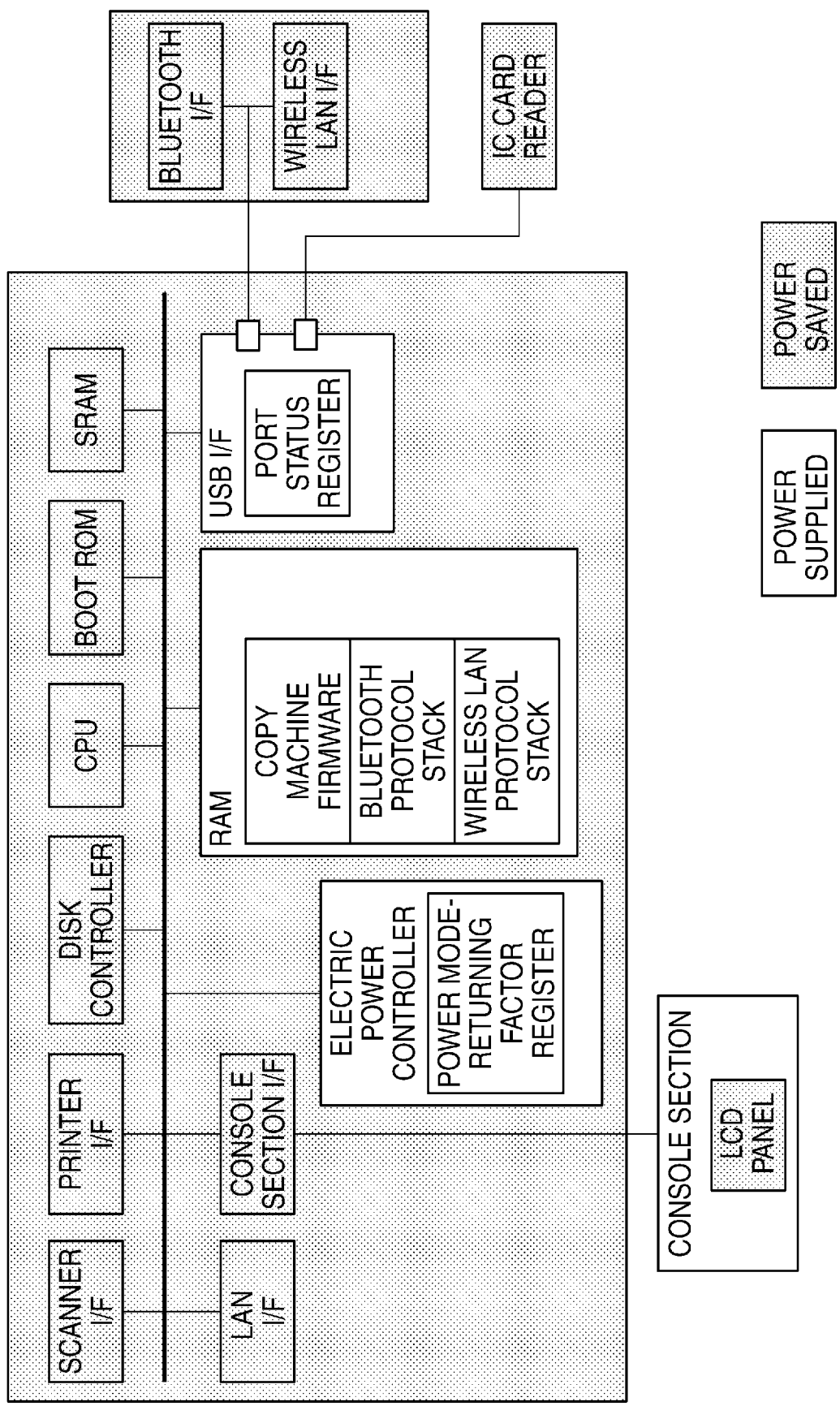

Referring to FIG. 4, first, if none of various types of processing are performed for a predetermined time period, set in advance, the CPU 201 sends a notification to the effect that the MFP 101 is to shift to the power saving mode to the USB devices connected to the first and second ports 216 and 217 (step S401). Upon receipt of this notification, the multi-function device 220 and the IC card reader 223 which are the USB devices connected to the first and second ports 216 and 217 shift to the USB power saving mode, as shown in FIG. 5A. Then, the CPU 201 controls the electric power controller 213 to cause only the second switch 304 to pass electric power to thereby cause the MFP 101 to shift to the power saving mode, as shown in FIG. 5B (step S402). At this time, electric power is not supplied to the LCD panel 106 of the console section 105. After execution of the step S402, the CPU 201 terminates the present process.

Next, a description will be given of a mode shifting process for causing the MFP 101 to shift from the power saving mode to the normal mode.

Figure 6A:
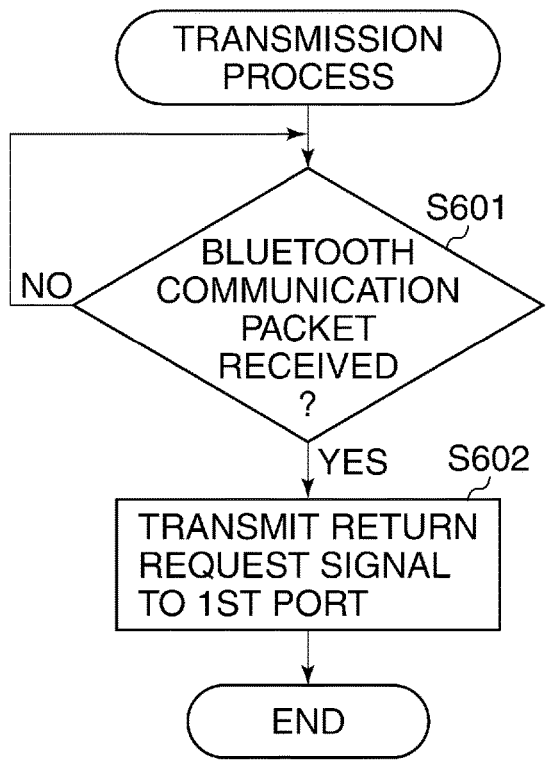
Figure 6B:
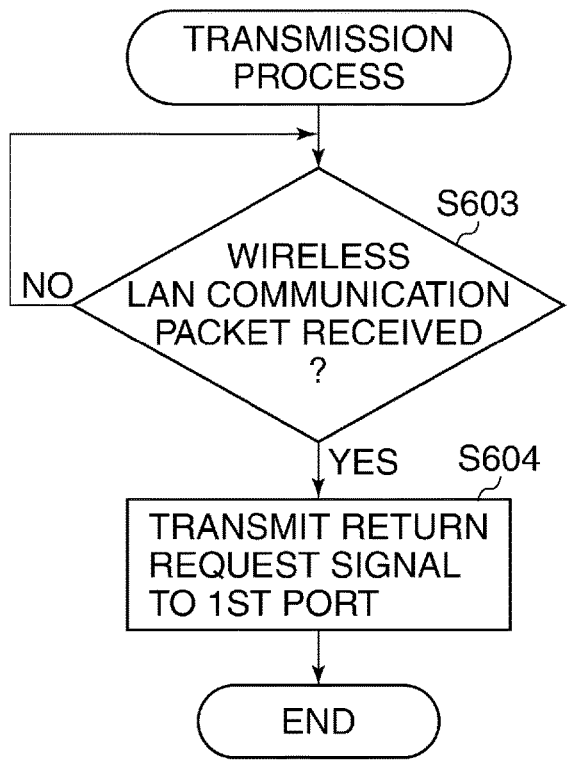
Figure 6C:
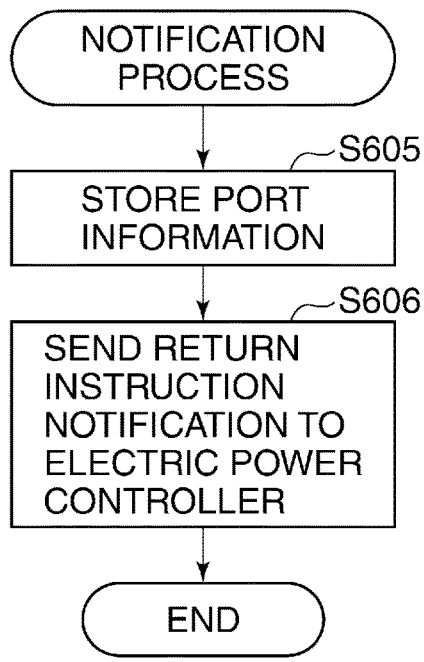
Figure 6D:
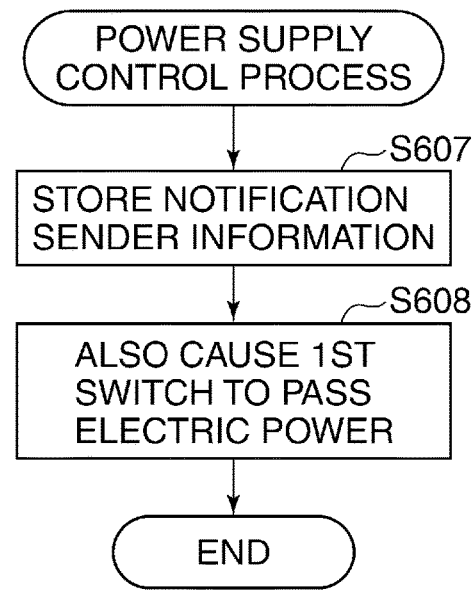

FIGS. 6A to 6D are diagrams useful in explaining the mode shifting process performed by the MFP and the USB devices, shown in FIG. 2, in which FIG. 6A is a flowchart of a transmission process performed by the Bluetooth interface 221, FIG. 6B is a flowchart of a transmission process performed by the wireless LAN interface 222, FIG. 6C is a flowchart of a notification process performed by the USB interface 215, and FIG. 6D is a flowchart of a power supply control process performed by the electric power controller 213.

The processes in FIGS. 6A to 6D are examples of the mode shifting process for causing the MFP 101 to shift from the power saving mode to the normal mode, and it is assumed that the USB interface 215 sends a return instruction notification to the electric power controller 213, based on a return request signal transmitted from the multi-function device 220e.

The multi-function device 220 in the present embodiment performs one of the transmission process by the Bluetooth interface 221 in FIG. 6A and the transmission process by the wireless LAN interface 222 in FIG. 6B, in the mode shifting process.

Referring to FIG. 6A, first, the Bluetooth interface 221 determines whether or not a Bluetooth communication packet for requesting Bluetooth communication has been received from another device (step S601). Then, upon receipt of a Bluetooth communication packet (YES to the step S601), the Bluetooth interface 221 transmits a return request signal to the first port 216 via the USB cable 224 (step S602), followed by terminating the present process.

On the other hand, referring to FIG. 6B, first, the wireless LAN interface 222 determines whether or not a wireless LAN communication packet for requesting wireless LAN communication has been received from another apparatus (step S603). Then, upon receipt of a wireless LAN communication packet (YES to the step S603), the wireless LAN interface 222 transmits a return request signal to the first port 216 of the USB interface 215 via the USB cable 224 (step S604), followed by terminating the present process.

In accordance with the processes in FIGS. 6A and 6B, the multi-function device 220 transmits the return request signal from one of the Bluetooth interface 221 and the wireless LAN interface 222 to the USB interface 215.

Next, a description will be given of the notification process in FIG. 6C performed by the USB interface 215 in the mode shifting process.

Referring to FIG. 6C, first, the USB interface 215 identifies a reception port out of the first and second ports 216 and 217, and stores port information indicative of the identified port in the port status register 218 (step S605). Then, the USB interface 215 sends a return instruction notification to the electric power controller 213 (step S606), followed by terminating the present process.

Next, a description will be given of the power supply control process in FIG. 6D performed by the electric power controller 213 in the mode shifting process.

Figure 5C:
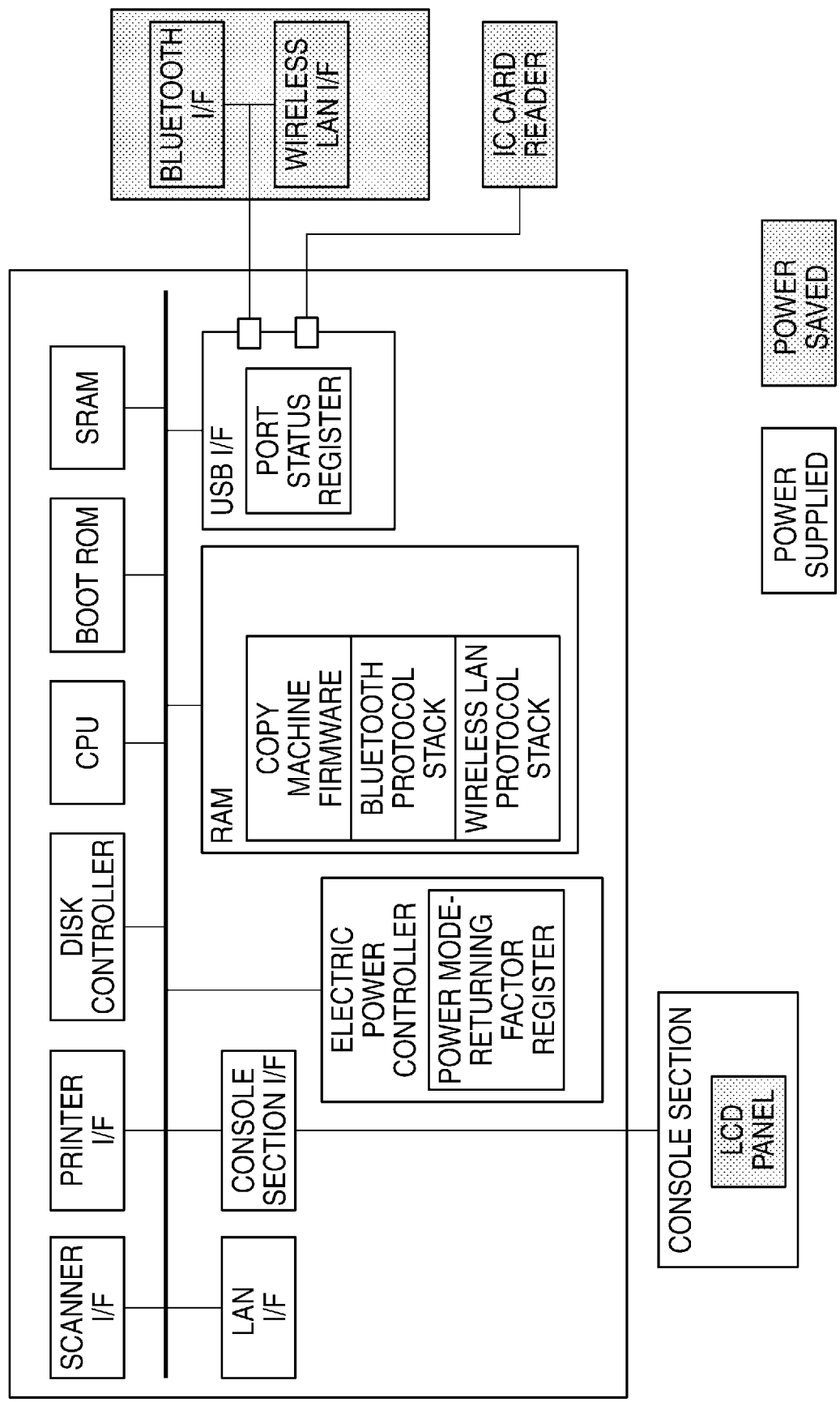

Referring to FIG. 6D, first, upon receipt of the return instruction notification from the USB interface 215, the electric power controller 213 stores notification sender information indicating that the sender of the return instruction notification is the USB interface 215 in the power mode-returning factor register 214 (step S607). Then, the electric power controller 213 causes the first switch 303 as well to pass electric power (step S608). With this, the MFP 101 shifts from the power saving mode to the normal mode, as shown in FIG. 5C. In the present embodiment, even when the MFP 101 shifts to the normal mode by executing the step S608, electric power is not supplied to the LCD panel 106, as shown in FIG. 5C, from the viewpoint of power saving. After executing the step S608, the electric power controller 213 terminates the present process.

Figure 7:
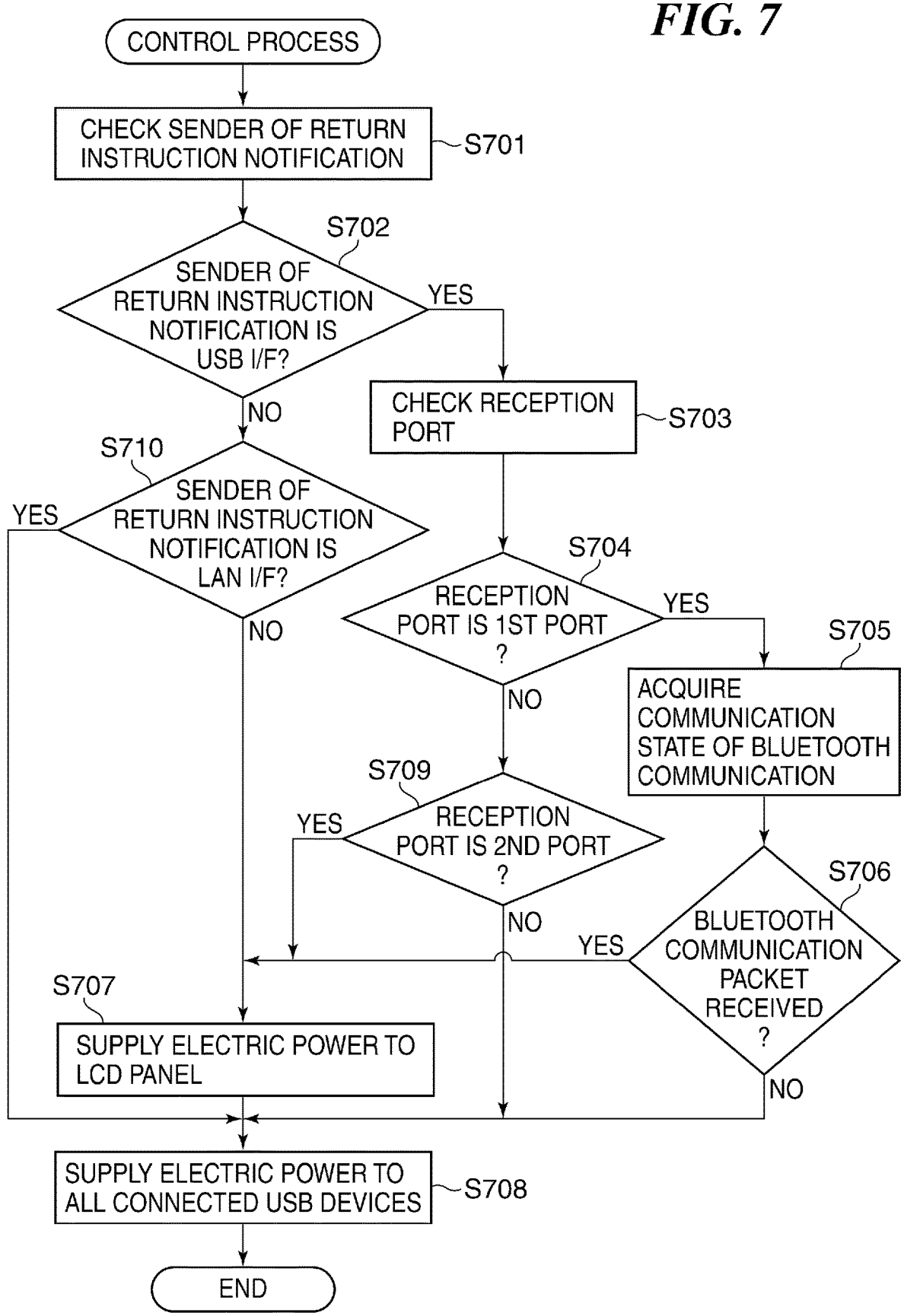
FIG. 7 is a flowchart of a control process performed by the MFP shown in FIG. 1.

FIG. 7 is a flowchart of a control process performed by the MFP 101 shown in FIG. 1.

The process in FIG. 7 is performed by the CPU 201 executing programs stored in the HDD 107 and the boot ROM 202, and it is assumed that the process is executed after terminating the process in FIG. 6D.

Here, the return request signal transmitted from a USB device connected to the MFP 101 includes only an instruction for returning from the power saving mode. On the other hand, there is a case where the USB device has the two functions of the Bluetooth communication function and the wireless LAN communication function, as is the case with the multi-function device 220. In this case, even when the MFP 101 receives a return request signal from the USB device having the two functions, the MFP 101 cannot determine whether the return request signal is transmitted due to the Bluetooth communication function or is transmitted due to the wireless LAN communication function. As a result, it is impossible to properly supply electric power to a destination associated with each function of the USB device.

On the other hand, in the present embodiment, it is determined whether a return request signal transmitted by a USB device is a signal generated due to the Bluetooth communication function or a signal generated due to the wireless LAN communication function, based not only on the return request signal, but also on a communication state of Bluetooth communication.

Referring to FIG. 7, first, the CPU 201 acquires the notification sender information from the power mode-returning factor register 214, and checks a sender of the return instruction notification (step S701). Then, the CPU 201 determines whether or not the sender of the return instruction notification is the USB interface 215, out of the console section 105, the LAN interface 211 and the USB interface 215 (step S702).

If it is determined in the step S702 that the sender of the return instruction notification is the USB interface 215, the CPU 201 acquires the port information from the port status register 218. Then, the CPU 201 checks the reception port (step S703). Then, the CPU 201 determines whether or not the reception port is the first port 216 (step S704).

If it is determined in the step S704 that the reception port is the first port 216, the CPU 201 sends a notification to the effect that the MFP 101 has shifted to the normal mode to the multi-function device 220 which is the USB device connected to the first port 216. Upon receipt of this notification, the multi-function device 220 returns to the normal mode to become capable of performing Bluetooth communication and wireless LAN communication, as shown in FIG. 5D. Then, the CPU 201 controls the Bluetooth protocol stack 205 to acquire the communication state of Bluetooth communication from the Bluetooth interface 221 (step S705). In the present embodiment, the communication state of Bluetooth communication includes information of reception of packet data by Bluetooth communication (hereinafter referred to as the "Bluetooth communication packet"). Then, the CPU 201 determines whether or not a Bluetooth communication packet has been received (step S706) (operation of a determination unit).

Figure 5E:
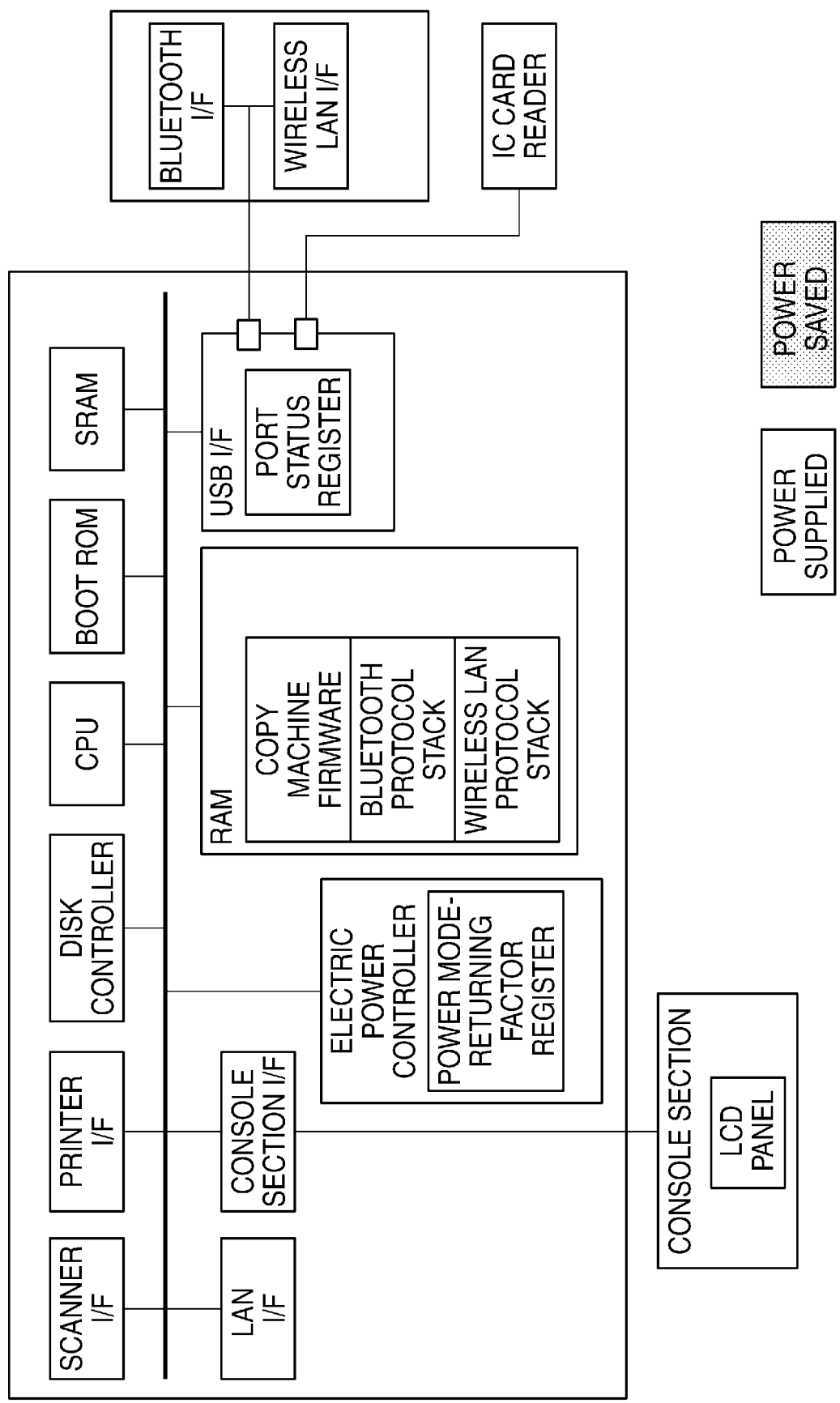

If it is determined in the step S706 that a Bluetooth communication packet has been received, the CPU 201 determines that the return request signal transmitted from the multi-function device 220 is a signal generated due to the Bluetooth communication function. Then, the CPU 201 decides electric power supply destinations associated with the Bluetooth communication function (operation of a decision unit). Here, in the case where the return request signal is a signal generated due to the Bluetooth communication function, the distance between the user and the multi-function device 220 is a distance over which short-distance wireless communication can be performed. That is, it is considered that the user stands at a location relatively close to the MFP 101 connected to the multi-function device 220, and the console section 105 is to be operated by the user soon. Therefore, it is preferable that electric power is immediately supplied to the LCD panel 106 of the console section 105 so as to enable the user to operate the console section 105 without waiting. Accordingly, in the present embodiment, when the return request signal is a signal generated due to the Bluetooth communication function, the CPU 201 controls the electric power controller 213 to supply electric power to the LCD panel 106 (step S707). As a result, the display of the LCD panel 106 is turned on. Then, the CPU 201 supplies electric power to all of the USB devices connected to the MFP 101 (step S708). Specifically, the CPU 201 also supplies electric power to the IC card reader 223, as shown in FIG. 5E. After executing the step S708, the CPU 201 terminates the present process.

If it is determined in the step S706 that a Bluetooth communication packet has not been received, the CPU 201 determines that the return request signal is a signal generated due to the wireless LAN communication function. Then, the CPU 201 decides electric power supply destinations associated with the wireless LAN communication function (operation of the decision unit). Here, in the case where the return request signal is a signal generated due to the wireless LAN communication function, the user can perform wireless communication also from a location distant from the MFP 101 connected to the multi-function device 220. That is, the location where the user stands is not limited to a location relatively close to the MFP 101, and the possibility that the console section 105 will be operated by the user soon is not high. Therefore, it is more profitable to give priority to power saving than to elimination of a waiting time for the user, and as a result, it is preferable to suppress power supply to the LCD panel 106. Accordingly, in the present embodiment, when the return request signal is a signal generated due to the wireless LAN communication function, the CPU 201 executes the step S708 with the display of the LCD panel 106 remaining to be turned off. By doing this, the MFP 101 is placed in the power state as shown in FIG. 5F. After executing the step S708, the CPU 201 terminates the present process.

If it is determined in the step S704 that the reception port is not the first port 216, the CPU 201 determines whether or not the reception port is the second port 217 (step S709).

If it is determined in the step S709 that the reception port is the second port 217, the user stands at a location relatively close to the MFP 101 connected to the IC card reader 223, and hence the CPU 201 executes the step S707 et seq. On the other hand, if it is determined in the step S709 that the reception port is not the second port 217, the location where the user stands is not limited to a location relatively close to the MFP 101, and hence the CPU 201 executes the step S708 et seq.

If it is determined in the step S702 that the sender of the return instruction notification is not the USB interface 215, the CPU 201 determines whether the sender of the return instruction notification is the LAN interface 211 out of the console section 105 and the LAN interface 211 (step S710).

If it is determined in the step S710 that the sender of the return instruction notification is not the LAN interface 211, but the console section 105, the CPU 201 executes the step S707 et seq. On the other hand, if it is determined in the step S710 that the sender of the return instruction notification is the LAN interface 211, the CPU 201 executes the step S708 et seq.

According to the above-described process in FIG. 7, it is determined whether a return request signal is a signal generated due to the Bluetooth communication function or a signal generated due to the wireless LAN communication function, based not only on the return request signal, but also on a communication state of Bluetooth communication. In the case where determination is performed only based on the return request signal, it is not known whether the return request signal is a signal generated due to the Bluetooth communication function or a signal generated due to the wireless LAN communication function. On the other hand, in the present embodiment, determination is performed based not only on the return request signal, but also on a communication state of Bluetooth communication, and hence it is possible to accurately determine whether the return request signal is a signal generated due to the Bluetooth communication function or a signal generated due to the wireless LAN communication function. As a result, by deciding power supply destinations in the returning process based on a result of the above determination, it is possible to properly supply electric power to the destinations associated with each of the Bluetooth communication function and the wireless LAN communication function.

Further, in the above-described process in FIG. 7, when a return request signal has been received, electric power is supplied to the LCD panel 106 if a Bluetooth communication packet has been received, and is not supplied to the LCD panel 106 if a Bluetooth communication packet has not been received. Here, the case where a return request signal from the multi-function device 220 has been received and a Bluetooth communication packet has been received is none other than a case where the multi-function device 220 has transmitted the return request signal due to the Bluetooth communication function. In this case, it is preferable that electric power is immediately supplied to the LCD panel 106 so as to enable the user to operate the console section 105 without waiting. On the other hand, the case where a return request signal from the multi-function device 220 has been received but a Bluetooth communication packet has not been received is none other than a case where the multi-function device 220 has transmitted the return request signal due to the wireless LAN communication function. In this case, it is more profitable to give priority to power saving than to elimination of a waiting time for the user, and as a result, it is preferable to suppress power supply to the LCD panel 106. Accordingly, in the present embodiment, when a return request signal has been received, electric power is supplied to the LCD panel 106 if a Bluetooth communication packet has been received, and is not supplied to the LCD panel 106 if a Bluetooth communication packet has not been received. This makes it possible to achieve both of improvement of user's convenience and power saving.

The present invention has been described with reference to embodiments, but the invention is not limited to the embodiment described above.

For example, electric power supply destinations may be decided based not only on a return request signal, but also on communication settings, described hereinafter.

Figure 8:
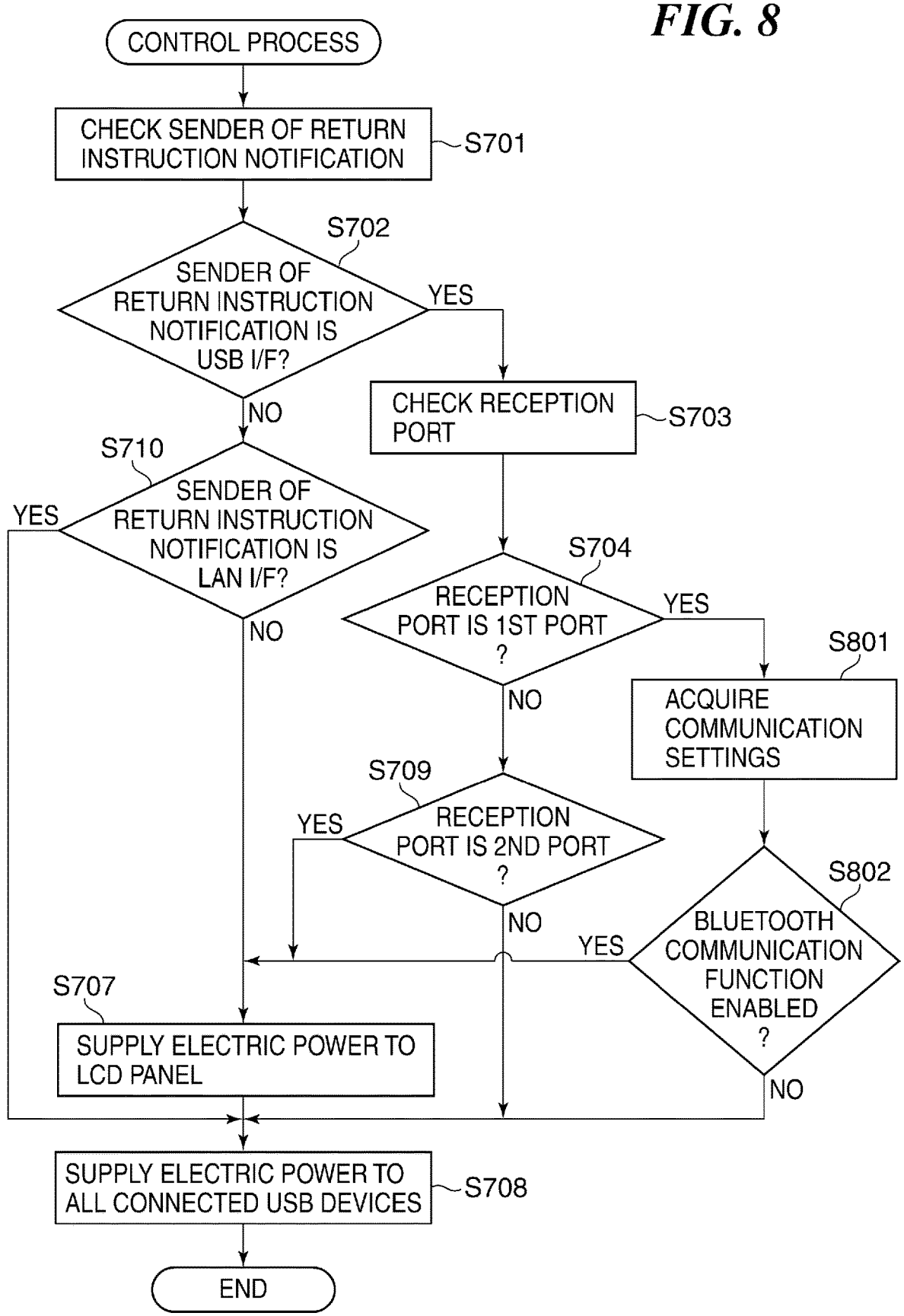
FIG. 8 is a flowchart of a first variation of the control process in FIG. 7.

FIG. 8 is a flowchart of a first variation of the control process in FIG. 7.

Figure 9:
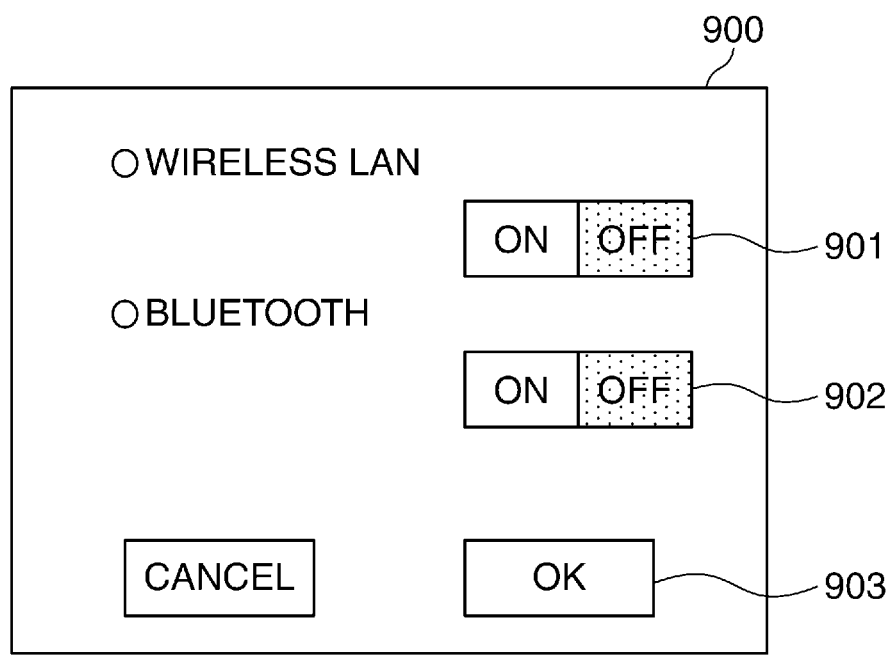
FIG. 9 is a diagram showing an example of a communication setting menu displayed on the LCD panel appearing in FIG. 1.

The process in FIG. 8 is performed by the CPU 201 executing programs stored in the HDD 107 and the boot ROM 202. Further, it is assumed that the process in FIG. 8 is performed after terminating the process in FIG. 6D, and that the communication settings have been made in advance via a communication setting menu 900 displayed on the LCD panel 106, which is described hereinafter with reference to FIG. 9.

Referring to FIG. 8, first, the CPU 201 executes the same steps S701 to S704 in FIG. 7.

If it is determined in the step S704 that the reception port is not the first port 216, the CPU 201 executes the step S709 et seq. in FIG. 7. On the other hand, if it is determined in the step S704 that the reception port is the first port 216, the CPU 201 acquires communication settings made from the communication setting menu 900 shown in FIG. 9 (step S801). The communication setting menu 900 includes setting buttons 901 and 902, and an OK button 903. The setting button 901 is used for setting the wireless LAN communication function to ON (enabled state) or OFF (disabled state). When a user uses the wireless LAN communication function, the user sets the wireless LAN communication function to ON (enabled state), whereas when the user does not use the wireless LAN communication function, the user sets the wireless LAN communication function to OFF (disabled state). The setting button 902 is used for setting the Bluetooth communication function to ON (enabled state) or OFF (disabled state). When the user uses the Bluetooth communication function, the user sets the Bluetooth communication function to ON (enabled state), whereas when the user does not use the Bluetooth communication function, the user sets the Bluetooth communication function to OFF (disabled state). The OK button 903 is used for finalizing the settings of the setting buttons 901 and 902. The communication settings set by the user are stored in the SRAM 207. Then, the CPU 201 determines from the acquired communication settings whether or not the Bluetooth communication function has been set to ON (enabled state) (step S802).

If it is determined in the step S802 that the Bluetooth communication function has been set to ON (enabled state), the CPU 201 determines that the return request signal is a signal generated due to the Bluetooth communication function, and executes the step S707 et seq. On the other hand, if it is determined in the step S802 that the Bluetooth communication function has been set to OFF (disabled state), the CPU 201 determines that the return request signal is a signal generated due to the wireless LAN communication function, and executes the step S708 et seq.

If it is determined in the step S702 that the sender of the return instruction notification is not the USB interface 215, the CPU 201 executes the step S710 et seq. in FIG. 7.

In the above-described process in FIG. 8, it is determined whether a return request signal is a signal generated due to the Bluetooth communication function or a signal generated due to the wireless LAN communication function based not only on the return request signal, but also on the communication settings. By doing this, the determination is performed based not only on the return request signal, but also on the communication settings, and hence it is possible to accurately determine whether the return request signal is a signal generated due to the Bluetooth communication function or a signal generated due to the wireless LAN communication function. As a result, it is possible to obtain the same advantageous effects as provided by the above-described process in FIG. 7.

In the present embodiment, electric power supply destinations may be decided based not only on the return request signal and the setting of the Bluetooth communication function, but also on the setting of the wireless LAN communication function.

Figure 10:
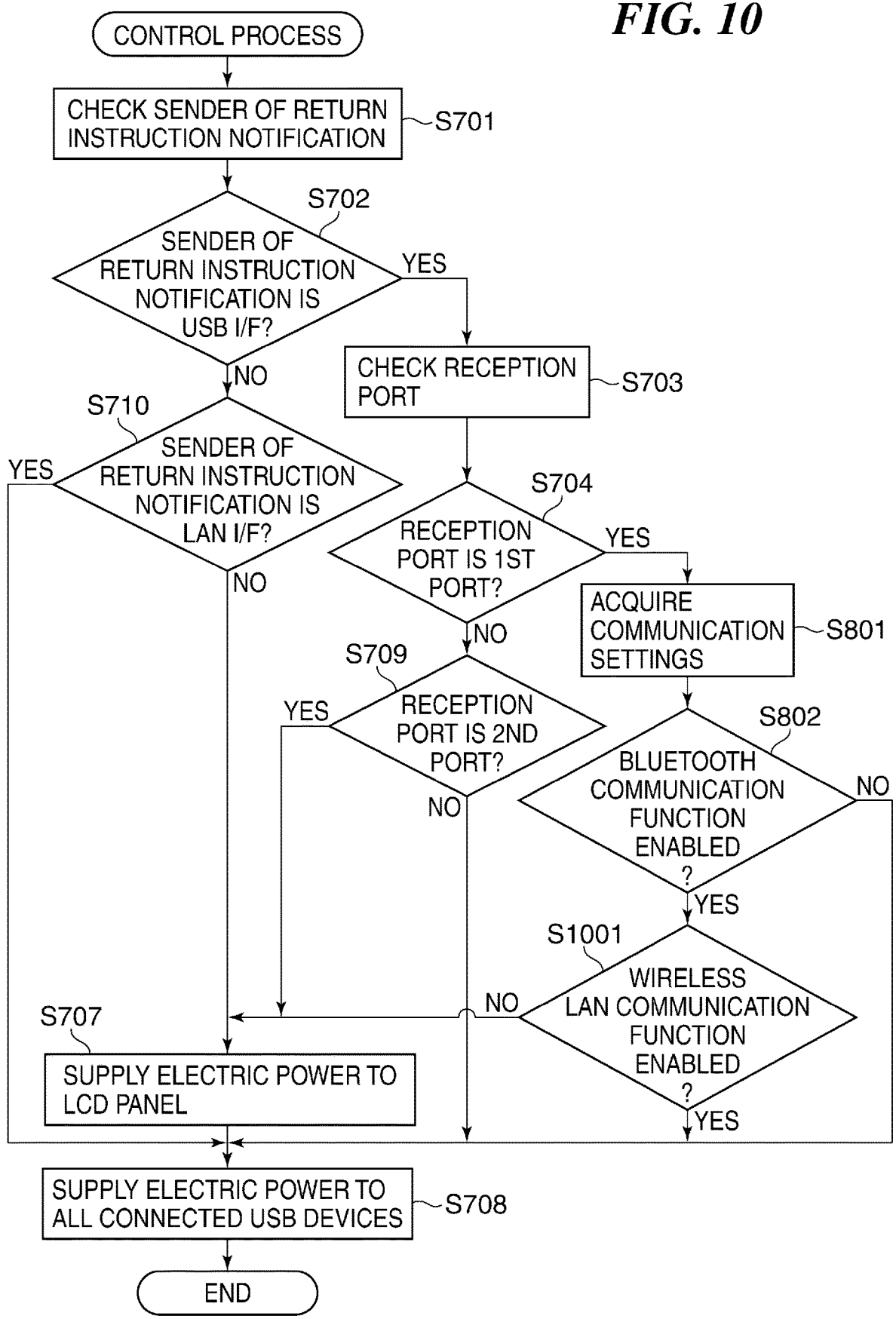
FIG. 10 is a flowchart of a second variation of the control process in FIG. 7.

FIG. 10 is a flowchart of a second variation of the control process in FIG. 7.

The process in FIG. 10 is performed by the CPU 201 executes programs stored in the HDD 107 and the boot ROM 202. Further, it is assumed that the process in FIG. 10 is performed after terminating the process in FIG. 6D, and that the communication settings have been made in advance from the communication setting menu 900 displayed on the LCD panel 106.

Referring to FIG. 10, first, the CPU 201 executes the same steps S701 to S802 in FIG. 8.

If it is determined in the step S802 that the Bluetooth communication function has been set to OFF (disabled state), the CPU 201 determines that the return request signal is a signal generated due to the wireless LAN communication function, and executes the step S708 et seq. On the other hand, if it is determined in the step S802 that the Bluetooth communication function has been set to ON (enabled state), the CPU 201 determines whether or not the wireless LAN communication function has been set to ON (enabled state) (step S1001).

If it is determined in the step S1001 that the wireless LAN communication function has been set to OFF (disabled state), the CPU 201 determines that the return request signal is a signal generated due to the Bluetooth communication function, and executes the step S707 et seq. On the other hand, if it is determined in the step S1001 that the wireless LAN communication function has been set to ON (enabled state), the return request signal is not limited to a signal generated due to the Bluetooth communication function, and hence the CPU 201 executes the step S708 et seq.

If it is determined in the step S704 that the reception port is not the first port 216, the CPU 201 executes the step S709 et seq.

If it is determined in the step S702 that the sender of the return instruction notification is not the USB interface 215, the CPU 201 executes the step S710 et seq. in FIG. 7.

In the above-described process in FIG. 10, in a case where a return request signal is received, when the Bluetooth communication function has been set to ON (enabled state), and the wireless LAN communication function has also been set to ON (enabled state), electric power is not supplied to the LCD panel 106. Here, when the wireless LAN communication function has been set to ON (enabled state), the user can perform wireless communication from a location distant from the MFP 101 connected to the multi-function device 220. Therefore, the location where the user stands is not limited to a location relatively close to the MFP 101, and the possibility that the console section 105 will be operated by the user soon is not high. In this case, it is more profitable to give priority to power saving than to elimination of a waiting time for the user. That is, it is possible to suppress power consumption without largely impairing the user's convenience even if electric power is not supplied to the LCD panel 106.

In the above-described process in FIG. 10, electric power supply destinations may be decided based not only on the return request signal, the setting of the Bluetooth communication function, and the setting of the wireless LAN communication function, but also on the communication state of Bluetooth communication. Specifically, if it is determined in the step S1001 that the wireless LAN communication function has been set to ON (enabled state), the CPU 201 determines whether or not a Bluetooth communication packet has been received. If it is determined that a Bluetooth communication packet has been received, the CPU 201 determines that the return request signal is a signal generated due to the Bluetooth communication function, and executes the step S707 et seq. On the other hand, if it is determined that a Bluetooth communication packet has not been received, the CPU 201 determines that the return request signal is a signal generated due to the wireless LAN communication function, and executes the step S708 et seq. Here, in a case where the Bluetooth communication function has been set to ON (enabled state), and the wireless LAN communication function has also been set to ON (enabled state), it is difficult to determine whether the return request signal is a signal generated due to the Bluetooth communication function or a signal generated due to the wireless LAN communication function. To cope with this, in the present embodiment, it is determined whether a return request signal is a signal generated due to the Bluetooth communication function or a signal generated due to the wireless LAN communication function, based on the communication state of Bluetooth communication. If a Bluetooth communication packet has been received, it is considered that the return request signal transmitted from the multi-function device 220 is generated due to the Bluetooth communication function. Further, if a Bluetooth communication packet has not been received, it is considered that the return request signal transmitted from the multi-function device 220 is generated due to the wireless LAN communication function. Therefore, by performing the determination based on the communication state of Bluetooth communication, it is possible to properly determine the factor (cause) of the return request signal transmitted from the multi-function device 220.

Further, in the present embodiment, electric power supply destinations may be decided based not only on the return request signal, but also on descriptor information indicative of the communication function of the multi-function device 220.

Figure 11:
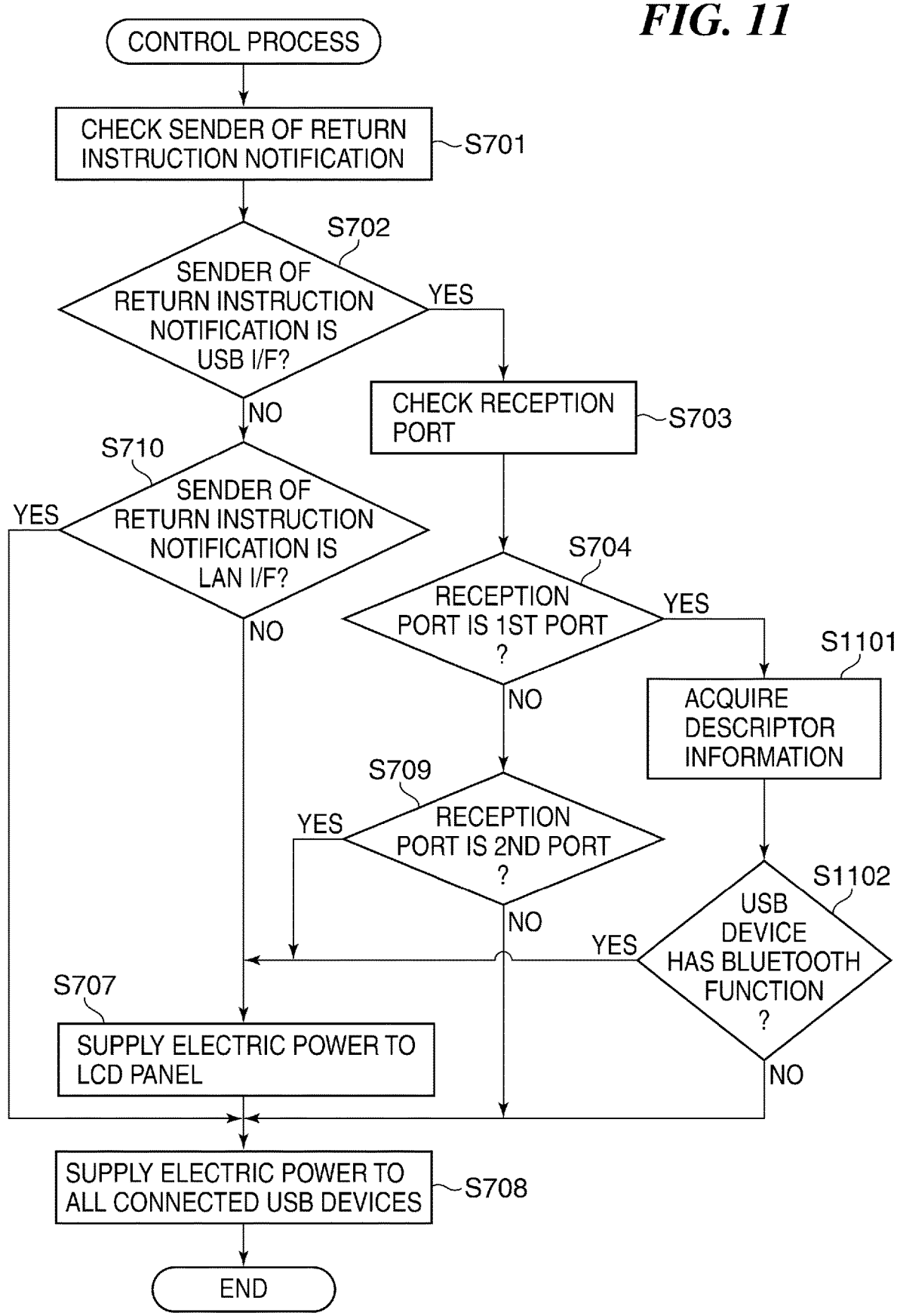
FIG. 11 is a flowchart of a third variation of the control process in FIG. 7.

FIG. 11 is a flowchart of a third variation of the control process in FIG. 7.

The process in FIG. 11 is performed by the CPU 201 executing programs stored in the HDD 107 and the boot ROM 202. Further, it is assumed that the process in FIG. 11 is performed after terminating the process in FIG. 6D, and it is assumed that a USB device having at least one of the Bluetooth communication function and the wireless LAN communication function is connected to the first port 216.

Referring to FIG. 11, first, the CPU 201 executes the same steps S701 to S704 in FIG. 7.

If it is determined in the step S704 that the reception port is not the first port 216, the CPU 201 executes the step S709 et seq. On the other hand, if it is determined in the step S704 that the reception port is the first port 216, the CPU 201 sends a notification to the effect that the MFP 101 has shifted to the normal mode to the USB device connected to the first port 216. Upon receipt of this notification, the USB device connected to the first port 216 returns to the normal mode to become capable of performing processing including processing for transmitting descriptor information. Then, the CPU 201 acquires the descriptor information from the USB device connected to the first port 216 (step S1101), and determines whether or not the USB device has the Bluetooth communication function (step S1102).

If it is determined in the step S1102 that the USB device connected to the first port 216 has the Bluetooth communication function, the CPU 201 determines that the return request signal is generated due to the Bluetooth communication function, and executes the step S707 et seq. On the other hand, if it is determined in the step S1102 that the USB device connected to the first port 216 does not have the Bluetooth communication function (e.g. a wireless LAN interface (USB device) 1201 appearing in FIG. 12), the CPU 201 determines that the return request signal is generated due to the wireless LAN communication function. Then, the CPU 201 executes the step S708 et seq.

If it is determined in the step S702 that the sender of the return instruction notification is not the USB interface 215, the CPU 201 executes the step S710 et seq. in FIG. 7.

According to the above-described process in FIG. 11, it is determined whether a return request signal is a signal generated due to the Bluetooth communication function or a signal generated due to the wireless LAN communication function based not only on the return request signal, but also on the descriptor information. By doing so, it is possible to accurately determine whether the return request signal is a signal generated due to the Bluetooth communication function or a signal generated due to the wireless LAN communication function. As a result, it is possible to obtain the same advantageous effects as provided by the above-described embodiment.

In the above-described embodiment, wireless communication includes wireless LAN communication, such as Wi-Fi communication, and hence it is possible to supply electric power to the destinations associated with wireless LAN communication.

Further, in the above-described embodiment, the short-distance wireless communication includes Bluetooth communication, such as BLE communication, and hence it is possible to supply electric power to the destinations associated with Bluetooth communication.

Although in the above-described embodiment, the description is given of the case where the power supply destination as an object to be controlled as to whether or not to supply electric power thereto is the LCD panel 106, the power supply destination as the object to be controlled is not limited to the LCD panel 106, but may be a component, such as the printer section 104 provided in the MFP 101.

While the present invention has been described with reference to exemplary embodiments, it is to be understood that the invention is not limited to the disclosed exemplary embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The scope of the following claims is to be accorded the broadest interpretation so as to encompass all such modifications and equivalent structures and function This application claims the benefit of Japanese Patent Application No. 2015-238691 filed Dec. 7, 2015, which is hereby incorporated by reference herein in its entirety.

What is claimed is:

1. An information processing apparatus that is operable in a power saving mode, comprising:
a wireless communication interface configured to perform communication using a wireless communication function;
a setting unit configured to set to enable the wireless communication function or disable the wireless communication function; and
a decision unit configured to decide, as an electric power supply destination, based on setting by the setting unit:
a first electric power supply destination, including an operation panel, to which electric power is to be supplied when the information processing apparatus returns from the power saving mode and the wireless communication function is enabled; and
a second electric power supply destination, not including the operation panel, to which electric power is to be supplied when the information processing apparatus returns from the power saving mode and the wireless communication function is disabled,
wherein the setting unit and the decision unit are implemented by one or more processors executing instructions stored in one or more memories.

2. The information processing apparatus according to claim 1, further comprising:
another wireless communication interface configured to perform communication using another wireless communication function; and
another setting unit configured to set to enable the another wireless communication function or disable the another wireless communication function,
wherein the decision unit is configured to decide first electronic power supply destinations in a case where the setting unit sets to enable the wireless communication function and the another setting unit sets to disable the another wireless communication function, and
wherein the another setting unit is implemented by one or more processors executing instructions stored in one or more memories.

3. The information processing apparatus according to claim 2, wherein the decision unit is configured to decide second electronic power supply destinations in a case where the setting unit sets to enable the wireless communication function and the another setting unit sets to enable the another wireless communication function.

4. The information processing apparatus according to claim 1, wherein the wireless communication function is a Bluetooth communication function.

5. A control method for controlling an information processing apparatus that is operable in a power saving mode and that has a wireless communication interface configured to perform communication using a wireless communication function, the control method comprising:
setting to enable the wireless communication function or disable the wireless communication function; and
deciding, as an electric power supply destination, based on the setting:
a first electric power supply destination, including an operation panel, to which electric power is to be supplied when the information processing apparatus returns from the power saving mode and the wireless communication function is enabled; and
a second electric power supply destination, not including the operation panel, to which electric power is to be supplied when the information processing apparatus returns from the power saving mode and the wireless communication function is disabled.

6. The control method according to claim 5, wherein the information processing apparatus includes another wireless communication interface configured to perform communication using another wireless communication function, the control method further comprising:
setting to enable the another wireless communication function or disable the another wireless communication function; and
deciding first electronic power supply destinations in a case where the wireless communication function is enabled and the another wireless communication function is disabled.

7. The control method according to claim 6, further comprising deciding second electronic power supply destinations in a case where the wireless communication function is enabled and the another wireless communication function is enabled.

8. The control method according to claim 5, wherein the wireless communication function is a Bluetooth communication function.

9. A non-transitory computer readable storage medium for storing a computer program for controlling an information processing apparatus that is operable in a power saving mode and that has a wireless communication interface configured to perform communication using a wireless communication function, the computer program comprising:
- a code to set to enable the wireless communication function or disable the wireless communication function; and
- a code to decide, as an electric power supply destination, based on setting by the setting unit;
    - a first electric power supply destination, including an operation panel, to which electric power is to be supplied when the information processing apparatus returns from the power saving mode and the wireless communication function is enabled; and
    - a second electric power supply destination, not including the operation panel, to which electric power is to be supplied when the information processing apparatus returns from the power saying mode and the wireless communication function is disabled.

10. An information processing apparatus that is operable in a power saving mode, comprising:
- a wireless communication interface configured to perform communication using a wireless communication function;
- a setting unit configured to set to enable the wireless communication function or disable the wireless communication function; and
- a decision unit configured to decide, as an electric power supply destination, based on setting by the setting unit:
    - a first electric power supply destination, including an operation panel, to which electric power is to be supplied when the information processing apparatus returns from the power saving mode according to reception of a signal from the wireless communication interface and the wireless communication function is enabled; and
    - a second electric power supply destination, not including the operation panel, to which electric power is to be supplied when the information processing apparatus returns from the power saving mode according to reception of the signal from another wireless communication interface and the wireless communication function is disabled,
- wherein the setting unit and the decision unit are implemented by one or more processors executing instructions stored in one or more memories.

11. The information processing apparatus according to claim 10, further comprising:
- the another wireless communication interface configured to perform communication using another wireless communication function; and
- another setting unit configured to set to enable the another wireless communication function or disable the another wireless communication function,
- wherein the decision unit is configured to decide first electronic power supply destinations in a case where the setting unit sets to enable the wireless communication function and the another setting unit sets to disable the another wireless communication function, and
- wherein the another setting unit is implemented by one or more processors executing instructions stored in one or more memories.

12. The information processing apparatus according to claim 11, wherein the decision unit is configured to decide second electronic power supply destinations in a case where the setting unit sets to enable the wireless communication function and the another setting unit sets to enable the another wireless communication function.

13. The information processing apparatus according to claim 10, wherein the wireless communication function is a Bluetooth communication function.

14. A control method for controlling an information processing apparatus that is operable in a power saving mode and that has a wireless communication interface configured to perform communication using a wireless communication function, the control method comprising:
- setting to enable the wireless communication function or disable the wireless communication function; and
- deciding, as an electric power supply destination, based on the setting:
    - a first electric power supply destination, including an operation panel, to which electric power is to be supplied when the information processing apparatus returns from the power saving mode according to reception of a signal from a wireless communication interface and the wireless communication function is enabled; and
    - a second electric power supply destination, not including the operation panel, to which electric power is to be supplied when the information processing apparatus returns from the power saving mode according to reception of the signal from another wireless communication interface and the wireless communication function is disabled.

15. The control method according to claim 14, wherein the information processing apparatus includes the another wireless communication interface configured to perform communication using another wireless communication function, the control method further comprising:
- setting to enable the another wireless communication function or disable the another wireless communication function; and
- deciding first electronic power supply destinations in a case where the wireless communication function is enabled and the another wireless communication function is disabled.

16. The control method according to claim 15, further comprising:
- deciding second electronic power supply destinations in a case where the wireless communication function is enabled and the another wireless communication function is enabled.

17. The control method according to claim 14, wherein the wireless communication function is a Bluetooth communication function.

* * * * *